United States Patent [19]

Phirippidis

[11] Patent Number: 5,469,999
[45] Date of Patent: Nov. 28, 1995

[54] MODULAR STORAGE AND ORGANIZING SYSTEM FOR VEHICLES

[76] Inventor: George Phirippidis, 5815 Commerce Dr., Fremont, Calif. 94555

[21] Appl. No.: 99,063

[22] Filed: Jul. 29, 1993

[51] Int. Cl.⁶ ........................................................ B60R 7/00
[52] U.S. Cl. ...................... 224/542; 220/23.4; 312/1 83; 248/129; 280/35
[58] Field of Search ........................... 224/42.42, 42.32, 224/42.33; 220/273, 23.4, 23.2, 615, 690, 23.6; 312/183, 184; 248/312.1, 222.4, 224.4, 101, 129, 154, 225.1; 190/24, 110, 111; 414/462; 280/35, 43, 43.15, 43.16, 79.11; 206/425; 229/120.01

[56] References Cited

U.S. PATENT DOCUMENTS

| | | | |
|---|---|---|---|
| 863,536 | 8/1907 | Hudson | 220/23.4 |
| 993,169 | 5/1911 | Hudson | 220/23.4 |
| 2,575,294 | 11/1951 | Putorak | 220/23.4 |
| 2,683,610 | 7/1954 | Brown | 280/35 |
| 3,331,613 | 7/1967 | Popelka | 280/35 |
| 3,343,706 | 9/1967 | Berend | 220/23.4 |
| 3,724,920 | 4/1973 | Beck | 206/425 |
| 4,226,348 | 10/1980 | Dottor et al. | 224/42.42 |
| 4,505,388 | 3/1985 | Solomon | 206/425 |
| 4,799,849 | 1/1989 | Miller | 414/462 |
| 4,936,454 | 6/1990 | Wang | 206/425 |
| 5,018,930 | 5/1991 | Handin et al. | 280/43.16 |
| 5,025,964 | 6/1991 | Phirippidis | 224/42.42 |
| 5,092,507 | 3/1992 | Szablak et al. | 224/275 |
| 5,193,701 | 3/1993 | Bush et al. | 206/425 |
| 5,246,151 | 9/1993 | Jabara | 224/42.42 |
| 5,261,577 | 11/1993 | Goldstein et al. | 220/23.83 |

FOREIGN PATENT DOCUMENTS

| | | | |
|---|---|---|---|
| 59737 | 1/1913 | Australia | 220/23.4 |

Primary Examiner—Henry J. Recla
Assistant Examiner—Gregory M. Vidovich
Attorney, Agent, or Firm—Jacques M. Dulin

[57] ABSTRACT

A modular storage and organizing system for vehicles including a plurality of generally box-shaped units and a length-wise and depth-wise expandable floor rack for restraining the units from undesired movement during vehicle operation. The box units include a main trough box unit, a hanging file box unit, a storage box unit, and an auxiliary box unit. Each box-shaped unit, includes a plurality of walls having a front panel, a rear panel spaced away from the front panel, a pair of opposed side panels spaced away from each other and connecting the front and the rear panels. At least one panel of each box unit, other than the auxiliary box unit, has an unflanged top edge. Each box-shaped unit, includes at least one panel having a generally candy-cane or semicircular shaped top flange for removably engaging the unflanged top edge of a panel of another box unit. The floor rack is disposed onto a floor or a seating surface of the vehicle, with the box units disposed onto the rack. The floor rack may be supported by stationary posts, or by a plurality of selectably lockable wheel assemblies.

8 Claims, 4 Drawing Sheets

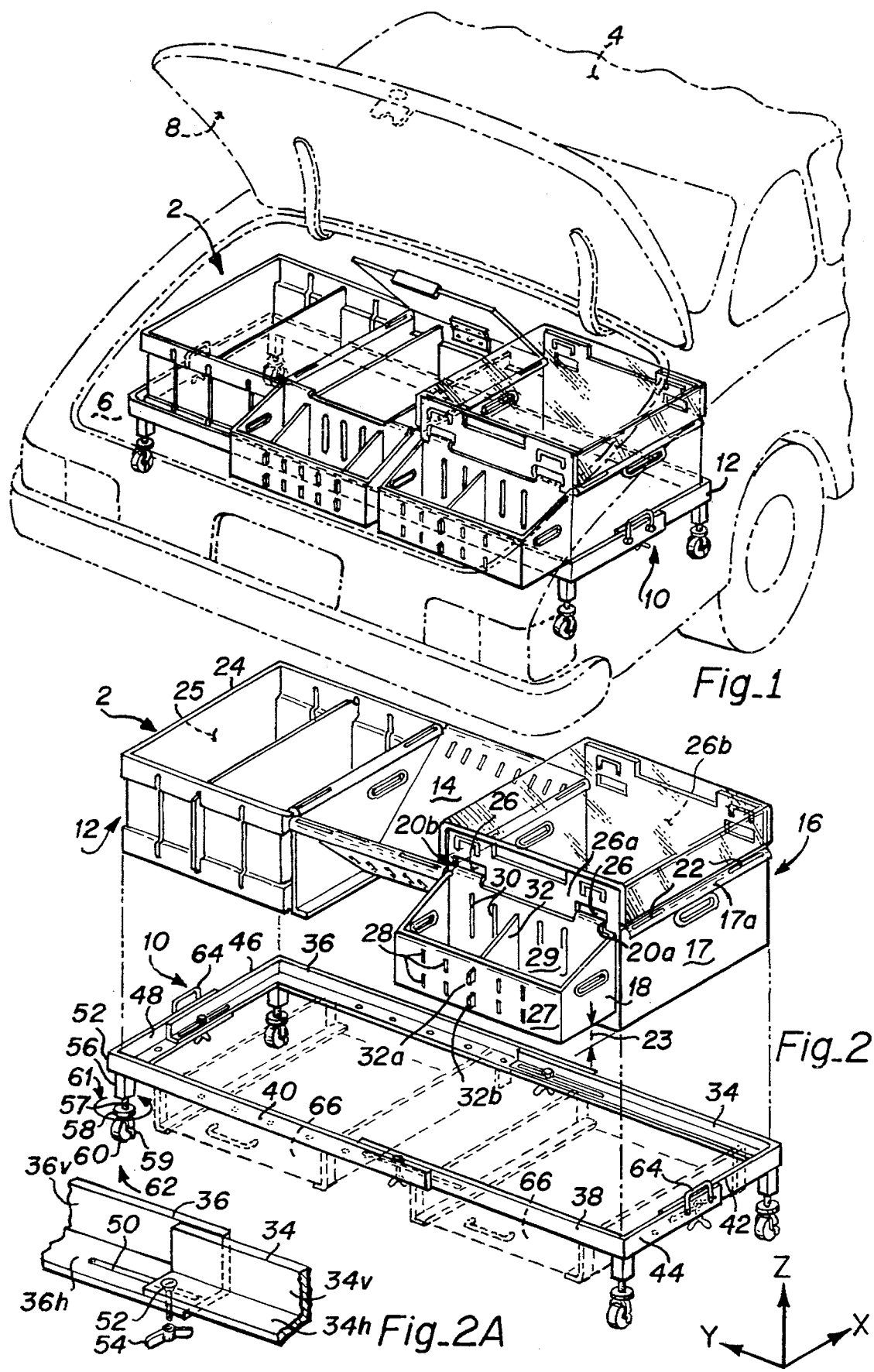

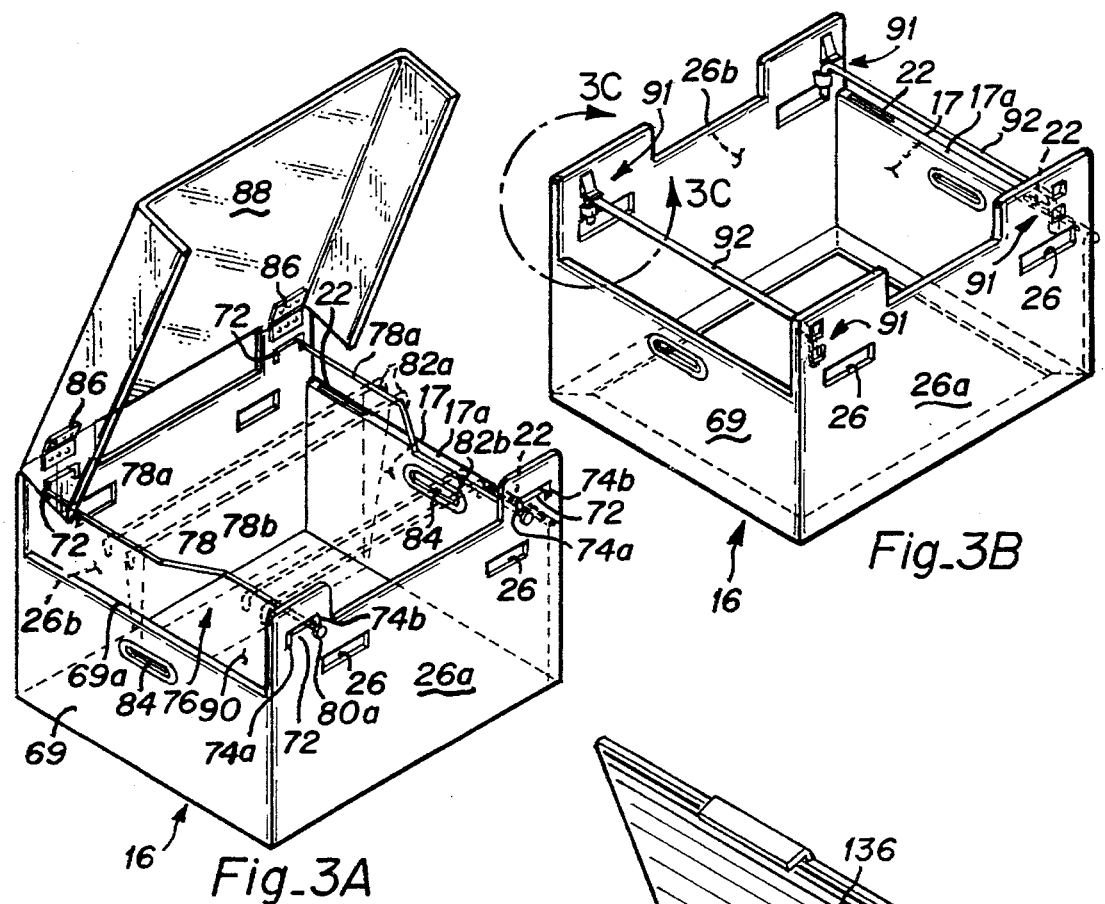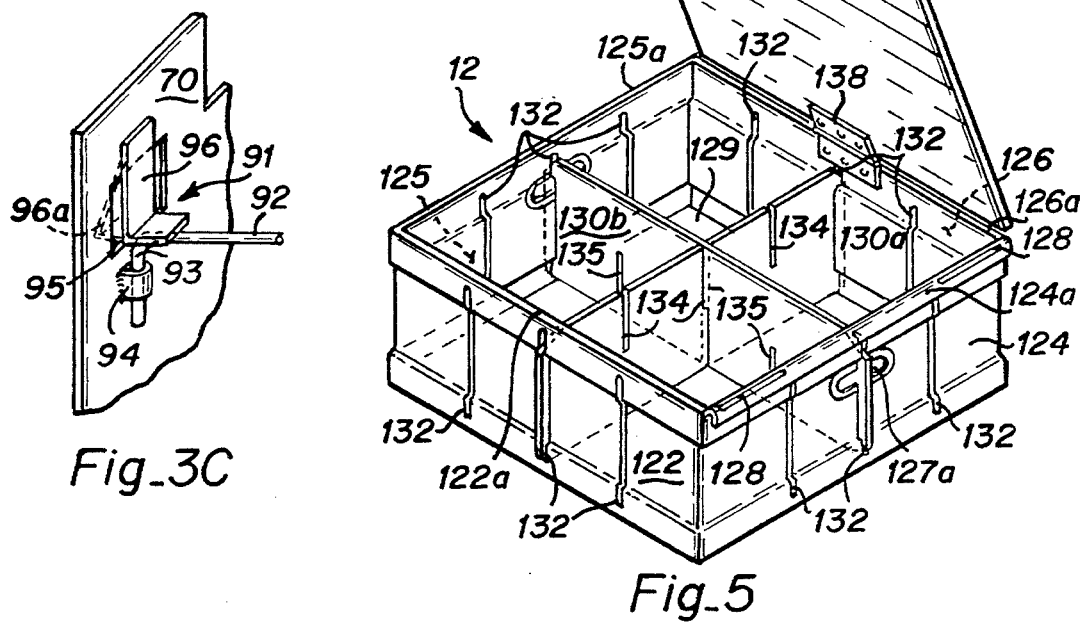

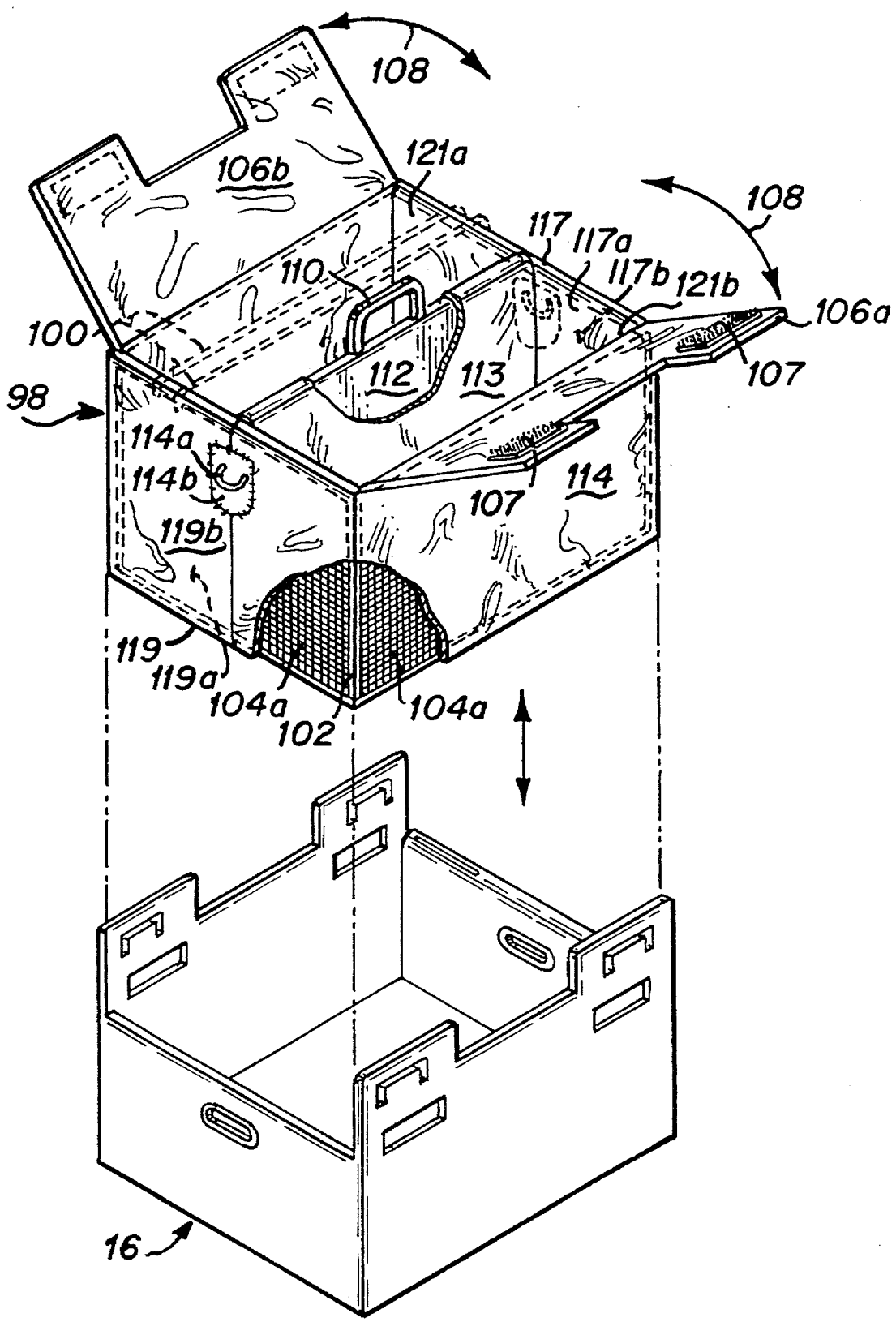
Fig_4

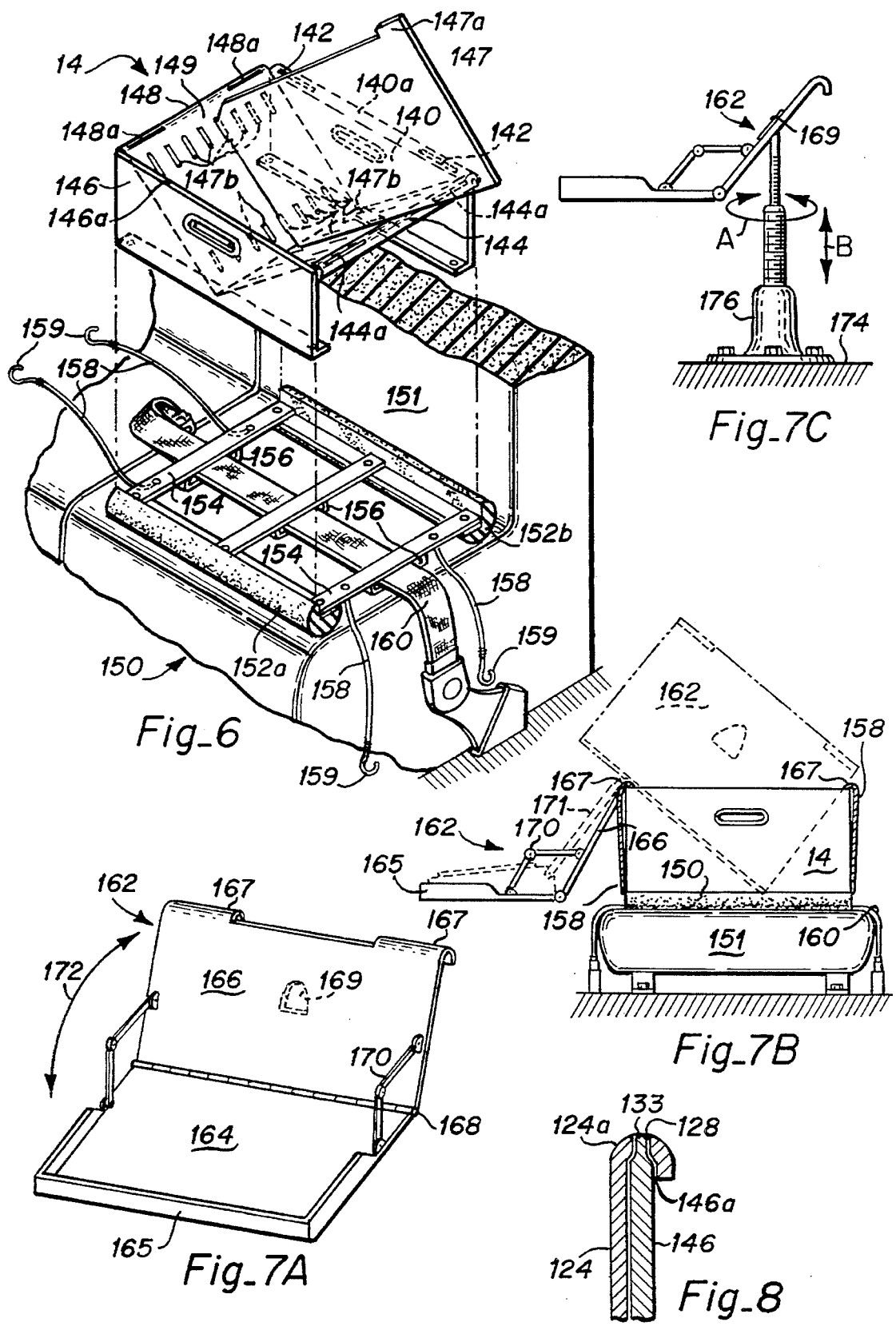

MODULAR STORAGE AND ORGANIZING SYSTEM FOR VEHICLES

FIELD

The invention relates to modular storage and organizing systems for use in a vehicle, and more particularly to systems for storing hanging file folders and bulk materials, and other items.

BACKGROUND

There are numerous occupations, e.g. sales, where it is convenient or necessary to carry an assortment of catalogs, brochures, tools, samples, utensils, files, etc. in an automobile, van, or other vehicle.

The traveling salesperson and members of related occupations are required to travel from place to place, carrying various items, e.g. catalogs, pamphlets, and other sales presentation materials. In many cases, the salesman is required to carry brochures, sales invoices, order forms, and other materials that can only be efficiently stored in file folder devices. In other cases, the number of catalogs and other materials that are needed to fully support sales activities are so numerous that the storage of such items in a vehicle presents a serious problem that interferes with an effective presentation to the customer. This is particularly the case for the salesperson whose company has many items in its products line, or who is a sales representative for more than one company, or who must leave fresh catalogs and other sales literature, order blanks, etc., with many customers.

Sales personnel frequently travel numerous miles in automobiles making sales calls. During these trips, catalogs, files, and other materials can easily get soiled, destroyed, or disorganized during the transportation process. Further, a well organized storage system would save the salesperson valuable time in selecting the proper materials from among the many that he may be required to carry.

U.S. Pat. No. 5,025,964 to Phirippidis discloses a storage and organizer system for catalogs and samples for use in automobiles, vans, and motor vehicles. The disclosed system is interlocking in that the system includes individual components, e.g. a main trough unit, and an auxiliary storage unit, that can be attached, affixed, or interlocked together into a single transportable unit. There are several shortcomings with the Phirippidis system. In order to interlock the auxiliary box with a main trough unit a locking lip or flange of the auxiliary box must be placed under a corresponding lip or flange of the main trough box. This is very difficult to accomplish if the boxes are located in a remote or cramped space in the vehicle. Also, a certain amount of clearance or open space is required surrounding the sides of the main trough box in order to angle in the auxiliary box under the lip of the main trough box. Further, the interlocking relationship is difficult to maintain if the main trough and auxiliary boxes are disposed on an uneven surface. Uneven surfaces cause the boxes to tilt with respect to one another and to disengage the locking flanges from one another. Finally, the auxiliary box cannot be hung onto or off of an adjacent main trough box unit or, for that matter, any other box unit of the system.

Another shortcoming of the system disclosed by Phirippidis, is that it is not well suited for storing hanging file folder style items (e.g. Pendaflex® style file folders). While there are other products in the prior art for storing hanging file style folders, there are many deficiencies associated with these products. Many products are not well suited for transport in vehicles, e.g. some such products do not have handles for carrying, others do not have non-skid surfaces to prevent sliding during transport. Also, some products although stackable one on top of the other, are not interlocking. That is, the individual file storage boxes cannot be latched or hooked onto a side, back or front of another individual file storage box or similar type box. Finally, none of these products can simultaneously hang, in one box, both letter and legal sized file folders. Frequently, one box can hang either legal or letter sized files by inserting legal sized files into the box in one direction (i.e., width-wise) or by inserting letter sized files into the box in another direction (i.e., length-wise). However, only legal or letter sized files may be hung in the box at any one time.

In the prior art, storage systems with interlocking components are frequently disposed onto a floor surface of a vehicle. In many vehicles the floor surface is uneven and keeping the components attached together becomes impossible to achieve or difficult to maintain. Also, once the interlocking storage system is fully assembled at one region on the vehicle floor, it is very cumbersome to maneuver the system to a different region of the vehicle floor. In many larger vehicle, e.g. vans and trucks, where there is considerable interior space available, such systems cannot be maneuvered about to accommodate changing space needs.

Prior art storage systems may be disposed on passenger seats of vehicles. However, the prior art systems are prone to slippage and excessive motion because they are not configured with motion restraining means for securing the system, or its components, in place on the seat. Also, such systems may damage leather or other fine upholstery when disposed on vehicle seats.

Accordingly, there is a need for an improved interlocking storage system which overcomes the disadvantages of the prior art.

THE INVENTION

OBJECTS

It is an object of this invention to provide a modular storage and organizing system having a plurality of modular interlocking units for the storing of catalogs, pamphlets, samples, parts, files, etc. as required by a salesman or repairman for demonstrating his products and making sales, and for other customer presentations.

It is another object of this invention to provide a modular interlocking unit for simultaneously storing and organizing letter sized and legal sized hanging file folders.

It is another object of the present invention to provide a device for containing the hanging file folders, that is removable from the storage and organizing system and is transportable into and out of the vehicle.

It is still another object of the invention to provide a simple means for restraining the movement of the storage and organizing system, while the vehicle is being operated.

It is yet another object of the present invention to provide means for supporting a laptop computer to the storage and organizing system.

These and other objects will be apparent from the following written description, drawings and appended claims.

DRAWINGS

The invention is illustrated in more detail in the figures in which;

FIG. 1 is a perspective view of a modular storage and organizing system constructed in accordance with one embodiment of the present invention and disposed in the trunk of an automobile.

FIG. 2 is a partially exploded perspective view depicting several components of the storage and organizing system.

FIG. 2A is an enlarged perspective view of a mechanism for expanding a floor rack unit illustrated in FIG. 2.

FIGS. 3A through 3C are perspective views illustrating greater details and two alternate embodiments of a hanging file box unit depicted in FIG. 2.

FIG. 4 is an exploded perspective view of a hanging file box assembly illustrated in FIGS. 3A and 3B.

FIG. 5 is a perspective view illustrating a storage box unit shown in FIG. 2.

FIG. 6 is an exploded perspective view of a main trough box, depicted in FIGS. 1 and 2, shown in cooperation with a bumper guard device disposed on a passenger seat of a vehicle.

FIG. 7A is a perspective view illustrating a device for supporting a laptop computer.

FIGS. 7B and 7C are elevation views depicting alternate means for supporting the device depicted in FIG. 7A.

FIG. 8 is an enlarged cross sectional enlarged view illustrating the detail of the interlocking engagement of individual box units of the storage and organizing system.

SUMMARY

A modular storage and organizing system for vehicles which includes a plurality of generally box-shaped units and a length-wise and depth-wise expandable floor rack for restraining the units from undesired movement during vehicle operation. The box units include a main trough box unit, a hanging file box unit, a storage box unit, and an auxiliary box unit. Each box-shaped unit, includes a plurality of side walls having a front panel, a rear panel spaced at a distance away from the front panel, a pair of spaced apart opposed side panels which connect the front and the rear panels. At least one panel of each box unit, other than the auxiliary box unit, has an unflanged top edge. Each box-shaped unit, includes at least one panel having a generally candy-cane or semicircular shaped top flange for removably engaging the unflanged top edge of a panel of another box unit. The floor rack is disposed onto a floor surface of the vehicle, with the box units disposed onto the rack.

The floor rack unit includes a plurality of overlapping right angle brackets. The overlapping brackets are slidably adjustable, in a manner similar to an adjustable bed frame, so as to expand the rack unit in both the width and depth directions. The rack unit may be supported by stationary posts, or by a plurality of selectably lockable wheel assemblies. In either configuration, the rack unit is adjustable so as to vary the height of the rack unit above the floor surface of the vehicle.

A box unit may be disposed onto a seating surface of the vehicle. A seat restraint unit works in cooperation with any of the box units, except the auxiliary box unit, to hold the box unit to the seating surface during vehicle operation. The seat restraint unit includes a plurality of bumper guard feet that provide a non-skid surface for restraining box movement and preventing damage to the seat surface. A plurality of cross brackets attach the feet together and provide a platform for supporting the box unit. The cross brackets are attached to the seat belt system of the vehicle. A plurality of elasticized straps are attached, at one end, to the cross brackets; the other ends are hooked on or into the box unit.

The hanging file box unit is configured to simultaneously accommodate both letter and legal sized hanging file folders. A pair of offset support rods are used to support both sized hanging file folders at the same time and in one box without having to re-orient the box unit as is the practice in the prior art. Each offset rod is formed having a curved or bent offset section that is disposed at the approximate center of each rod thereby dividing the offset rod into an outer-spaced section and an inner-spaced section. Two U-shaped slots are formed through each of the front and rear panels of the box unit. Each U-shaped slot has two downwardly directed slots: a downward directed inner slot and a downward directed outer slot. The center-to-center distance between the two downward directed inner slots formed on each of the front and rear panels corresponds to the width of a letter sized file folder, while the center-to-center distance between the two downward directed outer slots corresponds to the width of a legal sized file folder. Thus, in order to simultaneously accommodate both style of folders, the end of the outer-spaced portion of the rod is placed into the downward directed outer slot, while the end of the inner-spaced portion of the rod is placed in the downward directed inner slot.

A hanging file tote bag is used to transport hanging file folders from the vehicle and may be used with the hanging file box unit. The tote bag includes a frame constructed from a standard legal or letter-sized drawer frame for hanging files that is cut to an appropriate length for use in the tote bag. The bag, while typically sized to fit within the hanging file box unit, may be sized to any length suitable for carrying. Sewable, glueable materials such as heavy nylon, canvas, or leather, along with a plastic mesh inner lining is used to fabricate a shell that sheathes the frame and forms the side, bottom and top walls of the tote bag. The tote bag is sized to simultaneously hang either letter sized file folders or legal sized file folders, but not both. The tote bag, closed at the top by overlapping top cover flaps fastened together by velcro closures, also includes a fabric covered rigid plastic or hardboard centerpiece sewn to the inner surfaces of a pair of opposing side walls. The center divider separates the inner volume of the bag into two generally equal volumed spaces, and supports a permanently attached handle for carrying the unit. Carrying strap mount pads are sewn into the outer surface of the side walls to accommodate a shoulder or hand strap. Reconfigurable pockets may be formed by attaching generally rectangularly shaped panels or dividers to velcro strips disposed on the inner walls of the bag.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 illustrates a modular storage and organizing system 2, disposed in a trunk compartment 6 of an automobile 4 with its trunk lid 8 raised to its open position (automobile 4, trunk compartment 6 and trunk lid 8 all shown in phantom). The system 2 includes a plurality of box-shaped units supported on a rectangular perimeter framework device or floor rack unit 10 that is disposed onto the floor of the trunk 6 and also supports the box units at a predetermined height distance above the floor of the vehicle 4. Although an automobile is depicted, the system 2 may be used with other motor vehicles, including but not limited to wagons, vans, pickup trucks and like commercial vehicles. Also, the system 2 need not be disposed in the trunk of the vehicle. For example, in larger vehicles, such as vans and trucks, the system may be placed on the floor of the cargo compartment.

FIG. 2 is a perspective view illustrating the system 2 removed from a vehicle. The system includes a plurality of box shaped units. In the particular combination illustrated in the figure, the system 2 comprises a storage box unit 12, a main trough unit 14, a hanging file box unit 16, and an auxiliary box unit 18. It will be appreciated that because of the modularity of the system, a variety of box unit combinations are possible and that the illustrated embodiment should not serve as a limitation on the numbers and combinations of units which comprise component parts of the system 2. The storage box unit 12, the main trough unit 14, and the hanging file box unit 16 are approximately 14 inches in length and width and will be discussed in greater detail in relation to subsequent figures.

The detail of the auxiliary box unit 18 is fully described in greater detail in my issued U.S. Pat. No. 5,025,964 and is hereby incorporated by reference. Although the auxiliary box unit disclosed in the above mentioned patent is generally similar to the auxiliary box unit 18 there are some significant differences. Firstly, two separate but identical hook tabs 20a and 20b extend upwardly from the rear panel of the box unit 18. These two tabs or flanges 20a, 20b are curved and sized such that they fit into slots or over flanges built into the upstanding side walls of adjacent box units, such as the storage box 12, the main trough unit 14, and the hanging file box unit 16. For example, the hook tabs 20a and 20b can hook into the slots 22 formed into the overturned flange 17a extending from the side wall 17 of the hanging file box unit 16. In the alternative, the hook tabs 20a and 20b can hook over an edge 24 formed in an upstanding side wall 25 of storage box unit 12. Finally, the hook tabs 20a and 20b can hook into the two horizontal cutouts or slots 26 formed in either the front 26a or the rear 26b upstanding side walls of the hanging file box unit 16. The design of the hook tabs 20a, 20b is one means of restraining the relative movement of adjoining box units. When hooked into a slot, the tabs 20a and 20b restrain the movement of the box unit 18 in the depth (X) and width (Y) dimension. Also, the tabs 20a and 20b are sized to provide a tight friction fit such that when the tabs 20a, 20b are hooked over an edge the box unit 10 is similarly restrained in the depth (X) and width (Y) dimensions.

The box unit 18 may be hung on the exterior of another adjacent box unit or may be hung on the interior (not shown) of another box unit. Thus, the auxiliary box unit 18 can be attached or interlocked with other box units of the system 2 even if surrounding space is limited, or even if the box units are disposed on uneven surfaces.

Secondly, another distinguishing feature of the auxiliary box unit 18 of the present invention, is that when it is hooked onto an adjacent box unit, there exists a predetermined vertical clearance 23 from the bottom of the auxiliary box 18 to the bottom of the box unit from which it hangs. This is a significant difference because this allows the auxiliary box unit 18 to virtually hang off the upstanding side walls of the respective box unit onto which it is hung. This allows the unit to be elevated above the floor surface of a vehicle and compensate for any unevenness in the floor surface.

Finally, the scheme for dividing the box 18 with box dividers has also been modified from the embodiment illustrated in my above cited U.S. patent. In the prior embodiment, an auxiliary box unit included a generally rectangular-shaped box divider having three hook tabs disposed along either front or rear edges of the divider. A first tab and a second tab are formed at the rear edge; the first tab is disposed at one extremity of the divider, the second tab is disposed at the distal extremity of the divider. A third tab is formed at one extremity along the front edge. There are two problems associated with the tab configuration of the divider. First, the third tab hooks over a top edge of the front upstanding panel of the auxiliary box and is prone to disengaging from the panel when the vehicle is jarred. Second, the divider frequently gives way and easily slides out of its vertical position because there is no tab disposed at a location along the front edge to cooperate with the third tab to lock the divider in place along its front edge.

In the box unit 18 used in the system of the present invention, two in-line slots 28 and a longer slot 30 are provided in the upstanding front 27 and rear side walls 29 of the box unit 18. Tabs 32a and 32b are engaged within slots 28, while a tab (not shown) disposed along the rear edge of the box divider 32 engages the slot 30. The tab 32a is fully secured within the slot 28 and the tab 32b firmly anchors the lower front edge of the divider 32 into the box unit 18. This configuration overcomes the deficiencies prevalent in the prior art embodiment and secures the divider 32 firmly within the box unit 18.

The rectangular perimeter framework or floor rack unit 10 includes a plurality of right angle brackets including rear brackets 34 and 36, front brackets 38 and 40, side brackets 42, 44, 46 and 48. In the illustrated embodiment, the rear brackets 34 and 36 are overlapping. Similarly, brackets 38 and 40 are overlapping, brackets 42 and 44 are overlapping, and brackets 46 and 48 are overlapping. The overlapping feature of the right angle brackets is to permit the floor rack unit 10 to expand along either the depth dimension (X), or the and/or the width direction (Y). As depicted, the rack unit 10 may be expanded along the width direction by adjusting the two pairs of overlapping brackets 34, 36, and 38, 40, respectively. The rack 10 may be expanded along the depth dimension by adjusting the overlapping brackets 42 and 44, and 46 and 48.

The overlapping bracket pairs are slidably adjustable, in a manner typically found on adjustable bed frames, as depicted in FIG. 2A. The bracket 36 includes an adjustment slot 50 formed through a vertical web 36v. The bracket 34, which overlaps the bracket 36, has a flat-head screw 52 disposed through a horizontal web 34h such that it downwardly extends and engages the adjustment slot 50 so as to allow the brackets 34 and 36 to slidingly cooperate with one another. The brackets 34 and 36 are held together by tightening wing nut 54 onto the screw 52.

In order to support the rack unit 10 to the floor of the vehicle and to prevent movement of the unit 10 along the floor of the vehicle, a support assembly 62 is disposed at a plurality of locations on the unit 10 As depicted in the illustrated embodiment, a support assembly 62 is located at each corner of the rack unit 10, although a different number and placement of support assemblies 62 is possible. In the preferred embodiment, the support assembly 62 includes a downwardly extending flat-head screw 52 disposed on the horizontal web of the corresponding right angle bracket, a coupling 56, having a female threaded end at disposed either end is threaded into the downwardly extending threaded portion of the screw 52. A wheel 60 is journalled to a wheel bracket 58 having an upstanding threaded screw 57 protruding therefrom. The threaded portion of the screw 57 is received into the remaining open end of the coupling 56. When the coupling 56 is turned in the direction of an arrow 61, the height dimension (Z) of the unit 10 is changed. Individually adjusting each coupling 56 at each corner of the unit 10 will alter the height of the unit 10 above the floor of the vehicle thereby customizing the unit 10 to account for the individual surface irregularities of a particular vehicle. Each wheel 60 is provided with a locking lever 59 for selectably locking the rotation of the wheel 60 in the bracket 58, thereby preventing the movement of the floor unit 10 along the vehicle floor. In this manner, the rack unit 10 may be selectively locked or unlocked to either prevent or permit the movement of the entire system 2 within the confines of the vehicle, thereby allowing the rack unit 10 to be moved aside and permit access to retrieve other items stored within the vehicle.

In the alternative, the wheels 60 could be replaced with non-rotating members such as a nylon-coated threaded posts (not shown) having an upstanding screwed end for fitting into a female end of the coupling 56. When configured in this manner, the floor rack 10 will remain adjustable along the height dimension, but will not be free to move along the floor of the vehicle.

In addition, the rack unit 10 is outfitted with a plurality of handle means 64 for carrying the unit 10 and associated box units from the vehicle. In addition, storage drawers 66 may be disposed on the bottom of the unit 10 to take advantage of the clearance space available between the rack unit 10 and the floor surface of the vehicle.

In the alternative, a floor rack unit 10 may be configured to be expandable in only one dimension. That is, the rack unit may be expandable along only the width dimension (Y), or along only the depth dimension (X).

FIG. 3A is a perspective view illustrating the hanging file box unit 16 which is configured to simultaneously accommodate both letter and legal sized hanging file folders. FIG. 3B is a perspective view illustrating the hanging file box unit 16 configured so as to accommodate either legal sized or letter sized hanging file folders, but not both. Referring now to both FIGS. 3A and 3B, the box unit 16 includes four upstanding side walls having a front panel 26a, a side panel 69 with an unflanged top edge 69a, a rear panel 26b and a side panel 17 with a top flange 17a. The side panels 69 and 17 are spaced away from each other and connect the front and rear panels together. The front panel 26a and the rear panel 26b are generally similar, each panel having formed therein two horizontal cutouts or slots 26 and two generally upside down U-shaped cut outs or slots 72.

The side panel 69 has a handhold 84 formed therein and an unflanged top edge 69a. The side panel 17 has a handhold 84, and a generally candy-cane shaped or semicircular shaped top flange 17a having two slots 22 formed therethrough. The box unit 16 may be joined to other box units of the storage and organizing system by hooking the top flange 17a over an unflanged top edge of a panel of another box unit. Similarly, other box units of the storage and organizing system may be hooked onto the top unflanged top edge 69a of the side panel 69 of the box unit 16. Thus, the individual box units of the storage and organizing system are interlockable and modular with respect to one another. It should be noted, that the auxiliary box unit 18 may be hooked on to either the front panel 26a, the rear panel 26b, or to one or both of the side panels 69 and 17. The hooked tabs 20a and 20b of the auxiliary box unit 18 are used to hook over and onto the unflanged top edge 69a of the side panel 69, or to hook into the slots 26 formed through the front and rear panels 26a and 26b. In addition, the hook tabs may be used to engage the slots 22 formed in the top flange 17a of side panel 17, and may be hooked on either the outside or the inside of the box front 26a or rear panels 26b.

The design of the top flange 17a and the top edge 69a are another means of restraining the relative movement of adjoining box units. When the flange 17a is hooked onto a top edge of an adjoined box unit (or when a flange of the adjoined box unit is hooked onto the edge 69a) the box unit 16 and the adjoined box unit are restrained from relative movement along the depth (X) and width (Y) dimensions. This is because the flange 17a is sized to provide a tight friction fit onto the unflanged top edge of the adjoined box unit.

It will be appreciated that the interlocking scheme utilized by all box units (e.g. box units 12, 14, 16, 18) of the system 2 overcomes the deficiency of prior art storage systems. For example, the box units 12, 14, 16 and 18 can be attached when surrounding space is limited; tilting and angling the box units is not required to achieve attachment of the box units. Also, attached box units remain interlocked even when disposed on irregular and uneven surfaces.

The box unit 16 is configured in alternate embodiments with either a bottom flange 90 (as shown in FIG. 3A) or no bottom flange (as illustrated in FIG. 3B). The bottom flange 90 may be constructed from steel, aluminum, plastic, or a wire-mesh grate material. In embodiments where the bottom flange has been left out, it is done so to specifically compensate for an uneven vehicle floor in the event that the boxes are to be placed directly on the vehicle floor.

In addition, the box unit 16 may be outfitted with a cover 88 that is attached via two hinges 86 mounted to the top portion of the rear panel 26b. The covers may be in a variety of colored clear acrylic, or lexan materials as well as aluminum or light-weight steel. The cover could be locking or unlocking.

A single box unit 16 may be configured to simultaneously hang legal sized and letter sized hanging file folders (e.g. Pendaflex® style folders). A single pair of offset support rods 76 are used to support both sized hanging file folders at the same time and in one box without having to re-orient the box unit as is the usual practice in the prior art.

Each offset rod 76 is formed having a curved or bent offset section 78 that is disposed at the approximate center of each rod 76. Thus, for example, offset support rod 76 is divided into an outer-spaced section 78a and an inner-spaced section 78b. The ends of the rod 76 are disposed into a support rod securing means, one embodiment of which is a U-shaped slot 72. The rods 76 are prevented from sliding out of the slot 72 by collars 80a which are disposed at either end of the rod 76.

The U-shaped slot 72 has two downwardly directed slots 74a and 74b. The center-to-center distance between the two downwardly directed slots 74b of slots 72, formed through the front panel 26a and/or the rear panel 26b, corresponds to the width of letter sized file folders; similarly, the center-to-center distance between the two downwardly directed slots 74a of slots 72, formed through either the front panel 26a and/or the rear panel 26b, corresponds to the width of legal sized file folders. Thus, in order to simultaneously accommodate both style of folder, the end of the outer-spaced portion 78a of the rod 76 is placed into the downwardly directed slots 74a, while the end of the inner-spaced portion 78b of the rod 76 is placed in the downwardly directed slots 74b.

It should be noted that a box unit 16 may also be used to accommodate only one style of folder by disposing a straight rod (not shown) into the appropriate downwardly directed slot.

FIG. 3B illustrates an alternate embodiment of the support rod securing means wherein the support rods 92 are fixed in place so as to accommodate either legal or letter sized file folders, but not both. Support rod securing means 91 are affixed to the front and rear panels 26a, 26b and will be discussed in greater detail below. The other features illustrated in the box are generally identical to those discussed with respect to FIG. 3A, also the illustrated embodiment may be configured with a bottom flange, and/or a hinged cover. Although not illustrated, it should be noted that a pair of securing means 91 could be formed on each of said panels 26a and 26b. In this way support rods generally similar to the rods 76 (FIG. 3A) could be used with the means 91. Thus, both letter and legal size folders could be simultaneously hung with the means 91.

FIG. 3C is a perspective view illustrating the means 91 for securing the support rods 92 to the front and rear panels of the hanging file box unit 16 illustrated in FIG. 3B. Although the rear panel support rod securing mechanism is illustrated, the description is equally applicable to the front panel support rod securing mechanism. The support rod 92 has a downturned section 93 which is slidably disposed into a collar 94. The collar 94 is punched out or formed from the panel 26b. A locking swing tab 96 is welded, riveted, or otherwise attached to an inner surface 71 of the panel 26b and covers a slightly larger cutout 95 formed through the panel 26b. The swing tab 96 is deflected back through the cutout 95 into the position indicated by the dashed lines 96a. When in this position, the support rod 92 may be moved in the vertical direction thereby removing the downturned section 93 from the collar 94. It will be appreciated that the spring tension in the tab 96 causes the tab 96 to return to a position over the rod 92 (as illustrated) thereby blocking any removal of the rod 92 from the collar 94.

FIG. 4 is a perspective view illustrating a hanging file tote bag 98 working in cooperation with the hanging file box unit 16. It should be noted that the tote bag 98 may be used with a box unit 16 having the support rods 76 installed or removed. The tote bag 98 is slidably disposed within the box unit 16 and is removable therefrom. It is transportable into and out of the vehicle and can be carried around much in the same way as any conventional piece of luggage. Although the tote bag 98 is primarily used in conjunction with the box unit 16, the tote bag 98 may be used by itself.

The tote bag 98 includes a frame 102 which is constructed from a standard legal or letter-sized drawer frame for hanging files and is cut to an appropriate length to be used for the tote bag 98. The tote bag 98 is typically sized to fit within the box unit 16, but may be sized to any length suitable for carrying. Sewable or glueable materials such as heavy washable nylon, canvas or leather may be used to fabricate the shell 104 that sheathes the frame 102 and forms the side, bottom and top walls of the tote bag 98. In addition, plastic wire mesh 104a is sewn into the top, bottom and sides of the tote bag 98 to provide an amount of rigidity to the bag 98. The tote bag 98 is sized so as to accommodate either letter sized file folders or legal sized file folders (as shown in phantom) but not both. The tote bag 98 is closed at the top by overlapping top cover flaps 106a and 106b which swing in the direction of arrows 108 such that flap 106a overlays 106b and is fastened to flap 106b by two velcro closures 107.

A rigid plastic or hardboard centerpiece 112 is encased within a shell 113. A carrying handle 110, for lifting and transporting the tote bag 98, is permanently attached to the centerpiece 112. The shell 113 is sewn to an inner surface 117 of the bag side 117 and to an inner surface 119a of the bag side 119. As illustrated, the shell 113 and encased centerpiece 112 divide the inside of the tote bag 98 into two generally equally sized portions 121a and 121b. The portion 121a may be utilized for storing hanging file folders (as illustrated in phantom). The portion 121b provides storage space for items other than hanging file folders. It will be appreciated that in the alternative both portions 121a and 121b could be used for hanging file folders, or both portions 121a and 121b could be used for other items. Also, the portions 121a and 121b need not have generally equal volumes.

In addition to the carrying handle 110, a shoulder or hand strap (not shown) may be attached to the tote bag 98 via a clasp ring 114a mounted to carrying strap mount pads 114b which are sewn onto an outer surface 119b of box side 119 and an outer surface 117b of box side 117. It will be appreciated, that velcro strips (not shown) may be sewn into any of the inner or outer surfaces of the shell and pocket dividers (not shown) with velcro tabbed ends may be inserted therein to form a plurality of readily configurable pockets within the tote bag 98.

Referring now to FIG. 5 which is a perspective view illustrating the storage box unit 12. The storage box unit 12 has a plurality of upstanding side walls including a front panel 122, a side panels 124 and 125, and a rear panel 126. The panels 124 and 125 are in spaced apart configuration and connect the front 122 and rear panel 126 together. The front panel 122 has a corresponding unflanged top edge 122a, while the rear panel 126 has a corresponding unflanged top edge 126a. The side panel 125 has a corresponding unflanged top edge 125a and a handhold 127b. Panel 124 has a handhold 127a and a corresponding top flange 124a which is similar in configuration to the top flange 17a of the side panel 17 of the hanging file storage box unit 16 illustrated in FIGS. 3A and 3B. That is, the top flange 124a has a generally rounded loop, candy-cane or semicircular shape flange having two slots 128 formed therein. The top flange 124a operates in a generally similar manner as the flange 17a and allows the box unit 12 to be attached to another box unit of the storage and organizing system of the present invention. The slots 128 are used to receivingly engage the hook tabs 20a and 20b of the auxiliary box unit 18 illustrated FIG. 2. It will be appreciated that the auxiliary box unit 18 or any other box unit of the system may also be attached to the interior or exterior of the storage box unit 12 along any of the unflanged top edges 122a, 125a, or 126a. Thus, the storage box unit 12 is completely interlockable with other box units of the storage and organizing system thereby making it a modular unit of the system.

The upstanding side panels are constructed of light sheet metal. A permanent bottom flange 129 is spot welded or riveted to a supporting flange (not shown) extending from the bottom edges of the upstanding side panels 122, 124, 126 and 125.

The unit 12 has provisions to accept a plurality of dividers, two of which are illustrated generally at 130a and 130b. The dividers 130a, 130b slide in and out of pre-formed slots 132 in the side panels 122, 124, 125, 126, and are similar in design to a card cage design in the rear of the computer, or in a medicine cabinet shelf. The divider 130a has its own slots 134 while the divider 130b has its own slots 135. The slots are approximately 0.125 inches wide by 3.5 inches deep running down the center. The slots of each divider 130a, 130b, therefore, have been designed to cooperate with the slots of other dividers such that the slots of a first divider may be received within the slots of a second divider such that the two dividers are linked together in a mutually perpendicular fashion as shown in FIG. 5. In this manner, an empty box may be quartered (as shown). The box illustrated in FIG. 5 has been quartered by the two mutually perpendicular dividers 130a, 130b, but it is understood that the box could also be divided into 6, 8, 12 or 16 sections by the addition of one, two, three or four additional dividers, respectively.

The box 12 has been designed to house a multitude of apparatus ranging from emergency equipment, shoes, coats, water, flares, cables, radios, tools etc. The ability to store these items effectively within the other box units of the storage and organizing system is difficult. However, by using the storage box unit 12 a user may itemize, store, and protect their mobile office supplies along with other recreational, safety and emergency goods. The storage box 12 may be used on its own or in concert with a plurality of auxiliary box units 18 to store smaller items.

In the embodiment illustrated, the box unit 12 is provided with a cover 136 attached to the rear panel top flange 126a via hinges 138. The cover 136 may be fashioned from clear, opaque, or solid plastic or metal materials.

Referring now to FIG. 6 which is a perspective view illustrating the main trough unit box 14 working in cooperation with an alternative embodiment of a restraining means for the storage system box units. The detail of the unit box 14 is fully described in my above cited U.S. Patent and is incorporated herein by reference. The unit box 14 of the present invention is distinguishable from the main trough box, item 5 in my previously cited patent, in that the unit box 14 has been redesigned to increase the modularity of the system.

A box divider 147 has been redesigned from the prior embodiment to resemble an 8½ inch by 11 inch piece of paper, with the addition of a tab 147a that protrudes from a corner of the divider 147. The tab 147a is approximately one inch wider than the 8½ inch width of the divider 147 and is three to four inches long, but is flat and not angled as in prior art embodiment. The tab 147a functions identically as in the prior art embodiment, and protects, itemizes and supports sales presentation literature. Thirteen slots 147b, at one inch centers, have been added to the trough angle 149 so that users can create large or small filing sections.

The side panel 140 of the unit box 14 has a generally rounded loop, candy-cane or generally semicircular shaped top flange 140a and two slots 142 formed therethrough. The top flanges 140a, 144 and 148 are generally similar in shape and configuration and operate in substantially similar fashion to the top flange 17a of box 16 or to flange 124a of box 12. In addition, the side panel 146 has an unflanged top edge 146a. Finally, the open faced portions of the unit box 14 have been formed with a top flange 144 and two slots 144a formed 25 therethrough, and a top flange 148 and two slots 148a formed therethrough. When so configured, the main trough unit box 14 may be attached to any of the other unit boxes of the storage and organizing system by hooking the flange 140a (or 144, or 148) over a corresponding unflanged top edge of another unit box. Also, another unit box of the storage and organizing system may be attached to the side panel 146 of the unit box 14 by hooking its own semicircular top flange over and onto the unflanged top edge 146a.

FIG. 8 is a cross-sectional view of a typical means for restraining the relative movement between adjacent adjoining unit boxes. In the illustrated case, the semicircular shaped top flange 124a of the panel 124 of the storage box unit 12 is hooked over the unflanged top edge 146a of the panel 146 of the main trough unit box 14. The edge 146a and the flange 124a are attached with a snug friction fit which results in the adjoined boxes 12 and 14 being restrained from moving relative to one another. It should be appreciated that this manner of attachment is found in every unit box of the storage and organizing system 2 and not merely the illustrated unit boxes 12 and 14. An alternate means for restraining the relative movement between adjacent unit boxes can be accomplished by providing a locking tab or key 133 (shown in phantom) to the unflanged top edge of a panel, wherein the key is receivingly engaged within a slot 128 formed in the overfitting semicircular shaped top flange 124a. In this way, the adjoined unit boxes are locked and restrained from moving relative to one another.

It should be noted that the auxiliary box unit 18 and its corresponding hook taps 20a and 20b are used to hook into the formed slots or over the unflanged top edges of an adjoining unit box; thus, in the illustrated arrangement, the hook tabs 20a and 20b of the auxiliary box unit 18 would hook into the slots 144a, 148a, or 142, or over the unflanged top edge 146a of unit box 14.

The unit box 14 works in cooperation with a restraint unit 150. Although the box 14 is illustrated as working with the restraint unit 150, the other unit boxes of the storage and organizing system, i.e., the storage box unit 12, the hanging file box unit 16, will work equally as well.

The restraint unit 150 includes two bumper guard feet 152a and 152b. These bumper guard feet devices can be made from solid rubber, or sand-filled nylon or cloth, or molded plastic styrofoam, or other moldable material. The feet 152a and 152b protect the seat 151 from the bottom surface of the unit box 14. Also, the feet 152a and 152b provide a friction surface for restraining the movement of the attached box during the operation of the vehicle. The length of bumper feet 152a and 152b is approximately 14 inches in length. That is, it is approximately the same length as the box unit 14 of the system. The bumper guard feet 152a and 152b are generally disposed parallel to one another and affixed with a plurality of cross brackets 154.

The cross brackets or frame means 154 are attached to the bumper guard feet 152a and 152b in a manner appropriate for the material selected for the feet 152a and 152b. The length of the cross brackets 154, that is the width of the restraining unit 150, is generally equal to the width of the unit box 14 disposed thereon (i.e.,14 inches).

A seat belt bracket or securing means 156 is mounted onto the bottom surface of each cross bracket 154. The seat belt bracket 156 is generally U-shaped in cross section and is sized sufficiently wide to receive a conventional lap belt of a motor vehicle thereby securing the frame or cross bracket, 154 to the seat belt 160 and therefore the seat 151 of the vehicle.

As illustrated in the figure, the seat belt 160 passes through the seat belt bracket 156 and beneath the cross brackets 154 thereby securing the seat restraint unit 150 to the passenger seat 151. To provide additional support and restraint of the supported box unit device, a plurality of elasticized support straps 158 and corresponding hooks 159 are utilized to hook into the slots formed in the top flanges or to hook over the unflanged top edge of the boxes. For example, in the illustrated configuration, the hooks 159 engage the slots 144a and 148a; if the box unit 14 is rotated 90 degrees, two hooks 159 engage the slots 142 of side panel 140 and the other two hooks hook onto the unflanged top edge 146a of panel 146. In this manner, the supported unit box 14 is completely secured onto the seat restraint unit 150 thereby preventing any undesired movement of the unit box 12 in the car during vehicle operation.

Referring now to FIG. 7A which is a perspective view illustrating a support platform 162 depicted in a folded apart configuration for supporting articles thereon, such as a laptop computer (not shown). The support platform 162 includes a base portion or podium 164 and a support flange or panel portion 166 pivotally joined together by a hinge 168 and a plurality of support brackets 170. The podium 164, onto which an article (i.e., a laptop computer) may be placed, is folded in the direction of an arrow 172 either onto or away from the support flange 166. The base portion 164 is prevented from rotating more than 140 degrees away from the support flange 166 by support brackets 170. In addition, an edge lip 165 running along the periphery of the podium 164 prevents the article from sliding off the podium 164 when in use. The support flange 166 has hook means or a pair of hook tabs 167 formed along the top edge of the flange. Also, on the backside of the flange 166, a generally V-shaped slot 169 is formed for receivingly engaging a support rod as will be described in greater detail below. The hook tabs 167 are generally semicircular in shape and essentially identical to the hook tabs 20a and 20b of the auxiliary box unit 18 illustrated in FIG. 2.

Referring now to FIG. 7B, which is a front elevation view of a passenger seat 151 on which is disposed, a seat restraint unit 150 and the main trough unit box 14 secured thereon by a plurality of support straps 158. It will be noted from the figure, that the support platform 162 is hung onto top flange 148 of the main trough unit box 14. When configured in this manner, the platform 162 may be folded down into the configuration illustrated in FIG. 7A to support a laptop computer 171 (shown in phantom). When not in use, the support platform 162 may be stored into the main trough unit box 14 as illustrated in phantom. Although the main trough unit box 14 has been depicted in the figure, other unit boxes of the storage and organizing system may be used in cooperation with the support platform 162. Because of the design of the hook tabs 167, and the modularity of the unit boxes, the support platform 162 may be hooked onto any other box units of the storage and organizing system.

Referring now to FIG. 7C which is a side elevation view depicting an alternate mechanism for supporting the support platform 162. In the embodiment illustrated, a ball-joint base or pedestal 176 is permanently mounted to the vehicle floor surface 174. A support rod or post 178 upwardly extends from the ball-joint base 176. The free end of the support rod 178 is shaped in a generally V-shaped configuration so as to slidably engage with the V-slot 169 formed on the back surface of the support flange 166 of the platform 162. The rod 178 is rotated in the direction of an arrow A so as to extend the rod 178 along the direction indicated by an arrow B. In this manner, the support platform 162 can be raised or lowered to a proper height for the user. It will be appreciated that in the alternative the V-slot 169 may be formed on the base portion 164.

It should be understood that various modifications within the scope of this invention can be made by one of ordinary skill in the art without departing from the spirit thereof. I therefore wish my invention to be defined by the scope of the appended claims as broadly as the prior art will permit, and in view of the specification if need be.

I claim:

1. An improved universal modular storage system for vehicles of the type having a plurality of adjacently disposed generally box-shaped storage units including at least one main storage unit and at least one auxiliary storage unit, each of said units having a plurality of upstanding panel walls including a front panel, a rear panel and a pair of spaced apart side panels disposedly connected between said front and rear panels and wherein at least one of said panel walls includes means for engaging a panel wall of an adjacently disposed storage unit, wherein the improvement comprises:

a) at least one panel wall engaging means having means for restraining relative movement between adjacently disposed storage units, said engaging means including i) a semi-circular flange having at least one slot, formed therethrough said flange being formed along the entire length of a first top edge of one of said panel walls and said slot being formed partially along said length;

ii) said semi-circular flange having a cavity on a bottom side thereof sized for receivingly engaging a second top peripheral edge of a panel wall of an adjacently disposed storage unit; and iii) said second top peripheral edge of said panel wall of said adjacently disposed storage unit includes a tab member extending therefrom sized for snug fit insertion within said slot when said semi-circular flange is receivingly engaged over said second top edge.

2. An improved universal modular storage system as in claim 1 which includes:

a) a rectangular perimeter framework receivingly engaging and supporting said storage units at a selected height distance above a floor surface of a vehicle.

3. An improved universal modular storage system as in claim 2 wherein said framework is size adjustable to accommodate a greater number of adjacently disposed storage units.

4. An improved universal modular storage system as in claim 3 wherein said framework includes means for height adjustment to vary the selected height distance of said storage units above said floor surface.

5. An improved universal modular storage system as in claim 3 wherein said framework includes a plurality of wheel assemblies to facilitate movement of said framework along said floor surface.

6. An improved universal modular storage system as in claim 4 wherein said framework includes a plurality of wheel assemblies to facilitate movement of said framework along said floor surface.

7. An improved universal modular storage system for vehicles, which storage systems have a plurality of adjacently disposed generally box-shaped storage units including at least one main storage unit and at least one auxiliary storage unit, each of said units having a plurality of upstanding panel walls including a front panel, a rear panel and a pair of spaced apart side panels disposedly connected between said front and rear panels and wherein at least one of said panel walls includes means for engaging a panel wall of an adjacently disposed storage unit, and at least one of said storage units is a hanging file box unit which includes:

a) a pair of support rods, each of said support rods having a first elongated end portion, a second elongated end portion and a medial bend portion therebetween, said first and second elongated end portions being offset a lateral distance from one another by said medial bend portion;

b) a pair of support rod securing means disposed on opposing panel walls of said hanging file box unit for attaching the end portions of each of said support rods to said opposing panel walls, the end portion of each of said support rod being attached in one of two laterally spaced positions, said positions being spaced apart a lateral spacing distance equal to said lateral offset distance; and c) said lateral spacing distance of said support rod securing means corresponding to a difference between a legal size file width and a letter size file width.

8. An improved universal modular storage system, as in claim 1, which further comprises:

a) a tote bag for transporting a plurality of hanging file folders, said tote bag is sized to fit within at least one of said storage units, said tote bag includes:

i) a frame providing free-standing support for said file folders;

ii) a flexible and non-self-supporting sheet material covering said frame and forming a plurality of side panels, a bottom panel, and a top panel; and iii) means for carrying said bag, said carrying means attached to at least one of said side panels.

* * * * *